July 11, 1950 N. J. BUREN 2,514,989
OUTSIDE REAR VISION MIRROR HAVING CONTRASTING COLORS
Filed Sept. 9, 1947 2 Sheets-Sheet 2
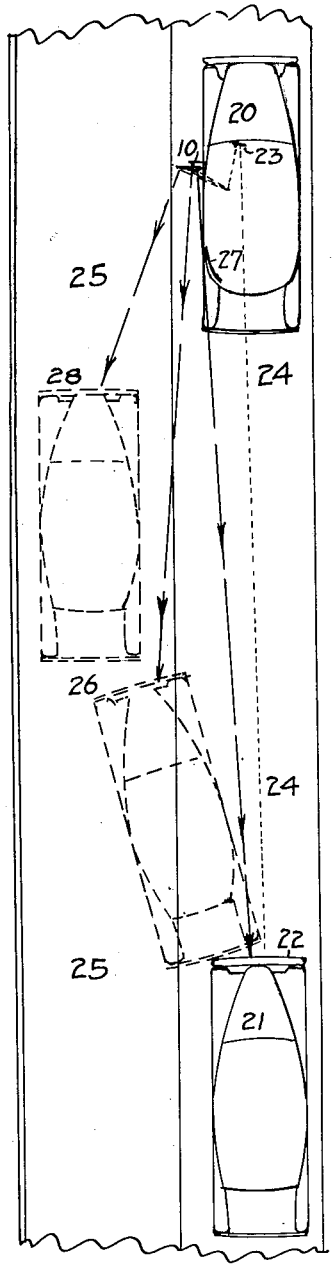
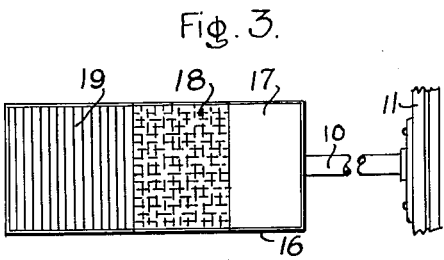
Fig. 3.
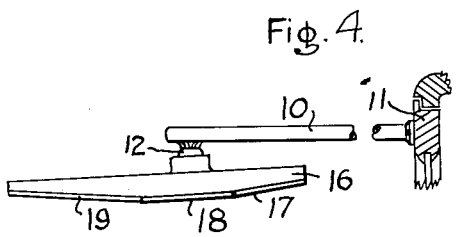
Fig. 4.
Fig. 5
Newton J. Buren
INVENTOR
ATTORNEY Patented July 11, 1950

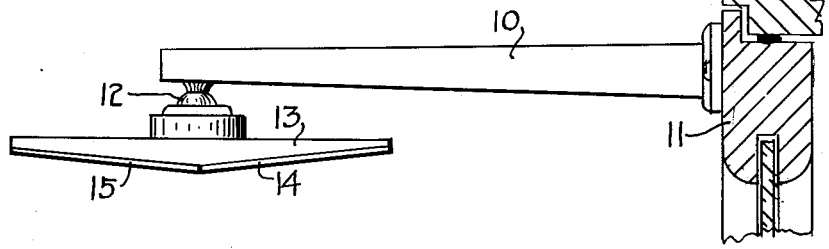
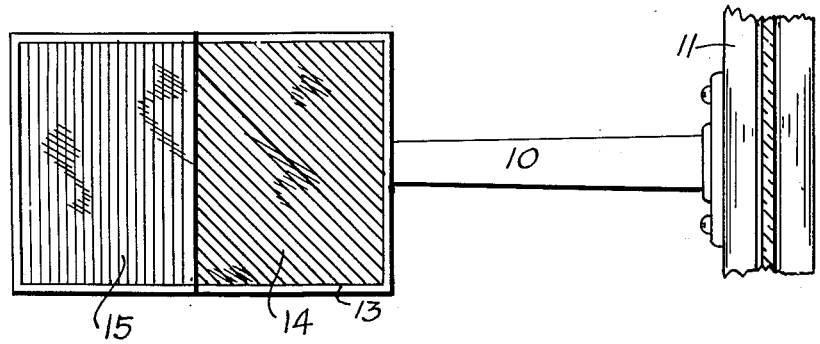

2,514,989

UNITED STATES PATENT OFFICE 2,514,989

OUTSIDE REAR-VISION MIRROR HAVING CONTRASTING COLORS

Newton J. Buren, Tacoma, Wash.

Application September 9, 1947, Serial No. 773,041

2 Claims. (Cl. 88—86)

This invention relates to mirrors fastened on the outside of a vehicle, such as an automobile, truck or other conveyance, to enable the driver of such vehicle to view the traffic in his immediate rear, and is an improvement over those mirrors commonly in use for that purpose in that it not only does all that is accomplished by the present mirrors, but eliminates therefrom their defects and has the added function of enabling the driver to watch, with eye comfort, the rear approaching car as it turns out of the driving lane into the passing lane and as it advances therein into the dangerous position at the rear left of the vehicle, thus warning the driver that he must not enter the passing lane until the said car has safely passed.

The objects of my invention are, first, to give a wide field of vision towards the rear and left side of a car; second, to eliminate therefrom the discomfort and confusion occasioned by the reflections of objects in the several parts of the mirror passing thereacross at widely different speeds; and third, to provide instinctive warning to the driver when there is danger on his left rear.

I attain these and other objects by the devices and arrangements illustrated in the accompanying drawings, in which—

Fig. 1 is a plan view of my improved compound mirror; Fig. 2 is a front view thereof, indicating the contrasting colors thereof; Figs. 3 and 4 are views similar to Figs. 1 and 2, respectively, showing a tripartite compound mirror; and Fig. 5 is a diagrammatic drawing to illustrate the use of such a mirror in following the motion of a passing car, thereby avoiding the "blind spot" present in rear-view mirrors at present in use.

Identical numerals of reference refer to the same parts throughout the several views.

One of the causes for accidents, sometimes of a minor character, between vehicles is when a car attempts to pass another car which is traveling in the same direction. For instance, a car traveling in the left, or passing, lane cannot be seen in his rear view mirror by the driver of a car ahead of it and traveling in the right-hand or driving lane, far enough or alongside of his car, if he has an ordinary single surface mirror on the outside of his car, as normally adjusted, because that car is entirely outside of his field of view. Therefore he will be completely unaware of its approach if the car is traveling at a higher speed. If, now, he believing the passing lane to be unoccupied, leaves the driving lane, in order to pass an object therein, he would move directly into the path of the approaching car with the possibility of a collision.

In order to eliminate this condition, I divide my improved mirror into two or three panels, set at slight angles to each other so as to spread the field of vision to cover a large area of passing danger. This construction also safeguards the driver in that, as he is turning to the left and the car axis has swung out from parallel with the road axis, the outside section of the mirror still shows the road to the rear. A further advantage of my improved mirror is found in the fact that, when entering a highway at an acute angle, as from a Y, the highway would be visible in the outside mirror for a considerable distance. Again, when backing to park the car in a space between two parked cars, the rear axis of the car would swing towards the curb, and all approaching traffic will be clearly shown in my improved mirror.

It is true that a convex mirror would enable the driver to have the same wide field of vision to the rear, but the image of a passing car, as seen by the driver, would be badly distorted therein and would appear only as a very narrow line and would be hardly recognizable as an impending danger.

Both of the above solutions of the wide field of vision are, by themselves, impractical because the strain on the driver's eyes, in watching the rear view in multiple panels, is very real and confusing. The reason for this condition is that the field covered by the mirror is not continuous, being slightly broken by the angular disposition of the flat reflecting surfaces and a space, marginal frames or other hiatus between such surfaces. Therefore, as the car is being driven forward, the speed of the image in the mirror next to the car, is slower by a considerable amount than that of the image in the next outer panel, in fact the image of objects in the panel next to the car will be diminishing in size while moving only slightly in the mirror, while the images of objects in the next mirror will move across the panel, and those in the third mirror will move across the mirror at a greatly increased speed. This fact of the difference in speed of the images in the several panels of the mirror, causes unbearable discomfort and confusion to the driver's eyes, when each reflecting surface is of the same character, clear, smoked, or uniformly colored. Moreover, with a single surface rear view mirror, a car that has turned out to pass or is passing at the left cannot be seen far enough or alongside of the car being passed to avoid accidents.

But, I have discovered, that if the several flat mirrors are separately and distinctively colored, especially with contrasting colors, this eyestrain and confusion disappears, and I therefore provide each mirror panel with a different color.

It has been the general practice to use the color green to indicate safety, amber or yellow to indicate caution, and red to indicate danger. Since the images in the mirror nearest to the car have but little movement, this mirror may be left clear, or tinted green, or smoked, if desired, and the driver's eyes naturally seek this inside panel and restfully watch the overtaking traffic until a car image moves from the inside mirror to those on the outer side thereof. In the two panel mirror shown in Figs. 1 and 2 the outer mirror may be tinted either yellow or red, and the intermediate mirror in Figs. 3 and 4 may be tinted amber or yellow while the outside mirror is tinted red. Thus the problem of viewing a wide angle with complete eye comfort is solved by the multiple colored multiple panel mirror, without in any way decreasing the efficiency of the wide field of vision to the rear.

Referring, now, to Figs. 1 and 2 of the drawings, it will be seen that my improved rear vision mirror is supported on a suitable bracket arm 10, secured to a suitable part 11 of the automobile or truck, in front of and to the left of the driver. An adjustable ball-and-socket joint 12 connects the arm 10 to the base 13 of the mirror. The face of the base 13 is provided with two flat mirrors 14 and 15 which are set side by side and with their reflecting surfaces at an angle slightly less than a straight angle or 180° between them. In this form of my invention the mirror 14 may either be tinted green, as shown, or may be smoked to prevent excessive glare from headlights at night. The mirror 15 is tinted either red, as shown, or amber if desired. Both mirrors are beveled at their contacting edges so that a line alone or single line of demarcation separates them. The shape of the said mirrors is preferably rectangular but may be circular or oval with no space, marginal frames or other hiatus therebetween.

Referring, now, to Figs. 3 and 4, it will be seen that the base 16 of the mirror carries three flat mirrors 17, 18 and 19, each set with their reflecting surfaces at an angle of slightly less than a straight angle or 180° from its next adjacent mirror. These mirrors are preferably rectangular and are arranged in contact with each other side by side with a single line of demarcation and no space or hiatus between their reflecting surfaces. They may be of equal or varying widths. As shown in the drawings the widths each subtend substantially equal arcs from the driver's eyes. I prefer to tint the inner panel 17 with green, or smoked as shown, the middle panel 18 with amber or yellow, and the outer panel 19 with red, it being understood that these colors may be changed, if desired, to other contrasting colors.

Referring now to Fig. 5, the automobile 20 is equipped with my improved rear-vision mirror. So long as the following car 21 is in the position 22, in the driving lane, it may be clearly seen in the usual inside mirror 23 or the panel 17 of the outside mirror in Figs. 3, 4, and 5, or the corresponding panel 14 of Figs. 1 and 2, and so long as it is in that position it is safe for the car 20 to turn to the left or to leave the driving lane 24 and enter the passing lane 25 in order to pass another vehicle occupying the driving lane 24, or for any other reason. If, however, the second automobile turns left into position 26, it is either in the normally "blind spot" 27 of the usual single surface rear-vision mirror or cannot be seen by the driver of the car 20 far enough or alongside of his car to warn sufficiently long against turning out to avoid a possible collision, but with my improved rear-vision mirror it will be plainly seen in the amber or yellow panel 18, red panel 19 or red or amber panel 15, further along or alongside car 20 in the passing lane 25 than with a single surface rear view mirror and the driver of the car 20 will then know that, though he still may turn into the passing lane 25, he should use extreme caution, especially if the overtaking car 21 is traveling at a higher rate of speed than he is.

When the overtaking car 21 reaches such position 28, as to be seen in the outer mirror 19, the driver of car 20 now knows that he cannot enter the passing lane 25 but should slow down slightly, unless there is a very clear roadway ahead, in order to let car 21 pass him and reenter the driving lane 24. When the passing car 21 moves out of the view of the mirror 19 it may then be seen by the driver of car 20 out of the corner of his eye and is then substantially side by side with the car 20.

Thus it will be seen that, by the use of my improved rear-vision mirror, an overtaking car is clearly visible in every position as it approaches, swings out into the passing lane, and passes the driver's car, and that these several positions automatically signal to him, by the color of the mirror in which it is seen, that he must successively become aware of its presence, be cautious against entering the passing lane, and must stay in the driving lane and slow down. Also that the use of contrasting colors in the several panels of the mirror prevent his eyes from becoming strained and confused by the clear view of the several fields of vision or by the differing motions in the several panels, and are protected from the glare of headlights of overtaking cars.

A further advantage in the use of contrasting colors on the several panels of my mirror, is that the change in color of reflected objects will assist the driver in measuring the changing relative interval between his car and the overtaking car. As an example, when the headlights of an overtaking car are seen to occupy a certain position in the mirror 15 its distance to the rear may be actually measured. When the image of the headlights first appear in the mirror 15 and are not visible in either the inside mirror 23 or the mirror 14, the driver has the advantage of knowing just how far to the rear the overtaking car is.

It is, of course, understood that many changes may be made in the details of construction of my invention as shown and described herein, such as varying the width or the angle of the several mirrors, without departing from the spirit of my invention as outlined in the appended claims.

Having, therefore, fully described my invention, what I claim and desire to secure by Letters Patent, is:

1. A rear view mirror for automobiles having a lateral bracket arm for mounting the same on the side of an automobile to project outwardly therefrom in front of the driver, whereby he may view the traffic in rear of the automobile, comprising a plurality of mirrors having separate flat reflecting surfaces, held in fixed relation horizontally aligned and at angles of slightly less than 180° to each other diverging forwardly and set in contact at their contiguous vertical edges to provide a single line of demarcation between adjacent mirrors, and over which the objects viewed while the automobile is in motion travel at different speeds, said surfaces being of contrasting color relative to each other, thereby enabling the driver to concentrate his vision on any one surface at a time without distraction by traffic or objects traveling at different speeds as reflected by another of said surfaces and rendering visible in an outer of said surfaces another automobile in a passing lane to the left, further along or alongside of his automobile than with the usual single surface rear view mirror and so that automobiles turning out of the driving lane to and in the passing lane are visible at all times by said driver.

2. A multiple surface rear view mirror comprising a base, a bracket arm connected at its outer end to the back of the base and its inner end adapted for attachment to the side of an automobile to project outwardly therefrom in front of and to the left of the driver whereby he may view traffic to the rear and side of the automobile, three mirrors set in the same horizontal plane across the front of the base, said mirrors having separate flat reflecting surfaces and being held in fixed angular relation to each other with their top and bottom edges in horizontal alignment and adjacent reflecting surfaces at angles of slightly less than 180° to each other diverging forwardly and with the contiguous vertical edges of adjacent mirrors in contact whereby images of objects are continuously viewable moving horizontally across all of said surfaces at different speeds in each surface, said surfaces being of contrasting color relative to each other thereby enabling the driver to concentrate his vision on any one surface at a time without distraction by objects traveling at different speeds as reflected in the other surfaces and rendering visible in the outer surfaces other automobiles turning out from the same lane at the rear into or in the passing lane to the left of the driver further along or alongside of his automobile than with a single surface rear view mirror, so that said other automobiles are visible at all times until they have passed.

NEWTON J. BUREN.

REFERENCES CITED

The following references are of record in the file of this patent:

UNITED STATES PATENTS

| Number | Name | Date |
| --- | --- | --- |
| D. 142,248 | Latshaw | Aug. 21, 1945 |
| 1,426,010 | Rees | Aug. 15, 1922 |
| 1,768,354 | Falze | June 24, 1930 |
| 1,781,999 | Bittinger | Nov. 18, 1930 |
| 1,869,456 | Bausch | Aug. 2, 1932 |
| 1,892,860 | Wehr | Jan. 3, 1933 |
| 2,165,498 | Moody | July 11, 1939 |
| 2,191,045 | Slayton | Feb. 20, 1940 |
| 2,251,325 | Clark | Aug. 5, 1941 |